April 26, 1938.  R. T. ROYE  2,115,319
BORING TOOL
Filed July 23, 1936
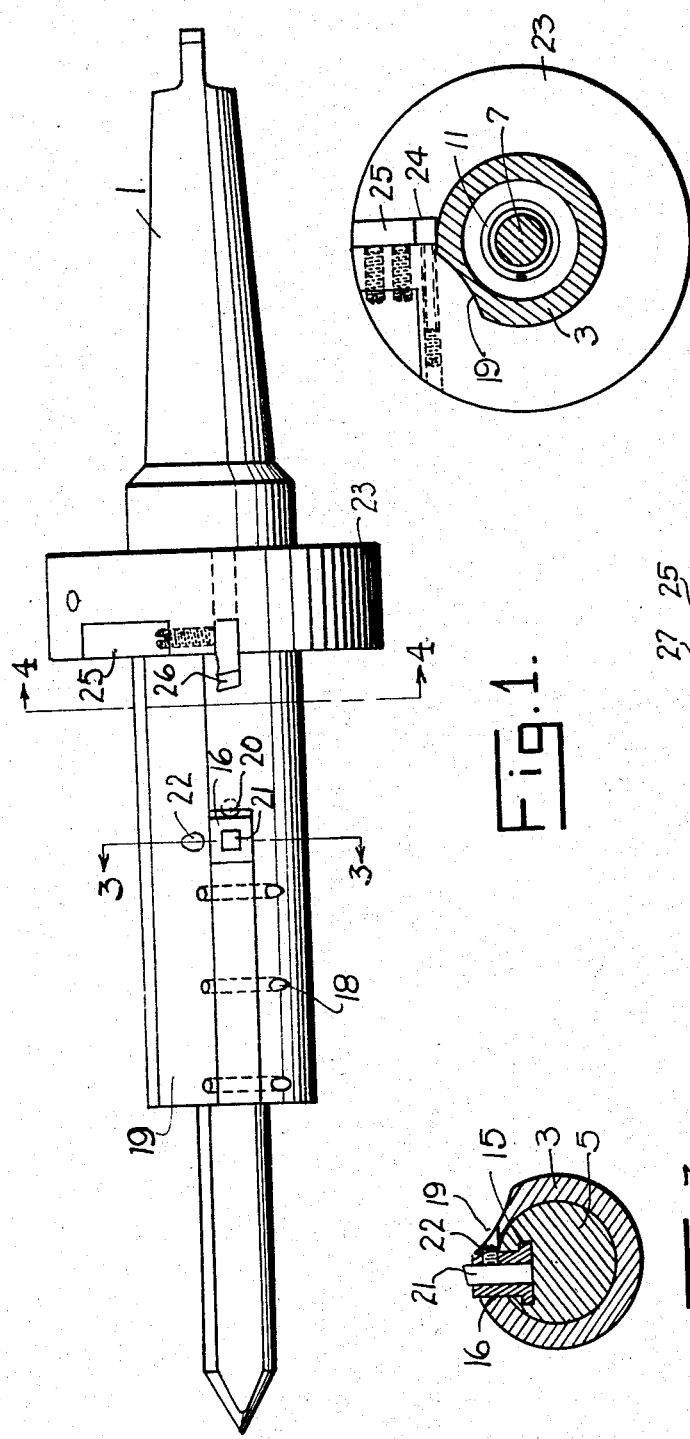
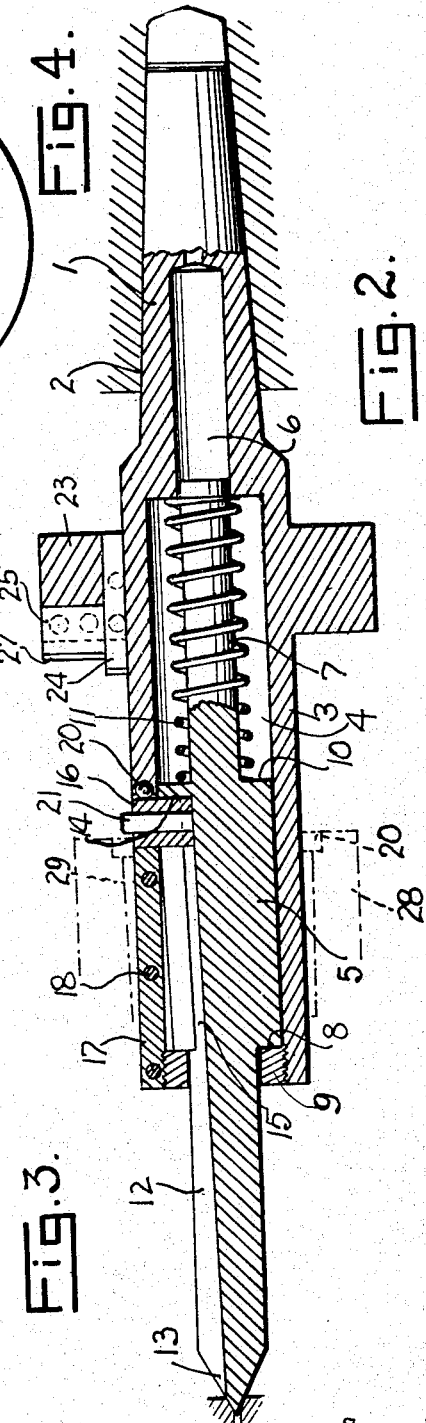
Richard T. Roye Inventor
By Jesse R. Stone
Lester B. Clark
Attorneys Patented Apr. 26, 1938

2,115,319

UNITED STATES PATENT OFFICE 2,115,319

BORING TOOL

Richard T. Roye, Houston, Tex., assignor to Gray Tool Company, Houston, Tex., a corporation Application July 23, 1936, Serial No. 92,179

1 Claim. (Cl. 77—56)

My invention relates to boring tools for use in machine tool operations.

The device is particularly designed for forming or boring tapered holes in tubular members.

It is an object of the invention to provide a strong and efficient tool for tapping a tapered hole in a tubular member such as a tool joint, coupling or the like, and to so control the cutting member that the taper will be uniform and precise.

It is a further object to provide a tool of the character stated which will hold the cutting bit in stable position axially of the work so that no variation in the cutting performed by the tool will occur.

It is an object of the invention to provide a boring tool which will properly prepare a tapered hole to receive a tapered tap, such as is used to cut oil country threads. By means of tapers within the housing of the tool a single cutter bit is fed at a fixed rate and taper into the work. By means of this single narrow bit less power is required to perform the operation, and at the same time the tool may be quickly and easily refaced in case foreign matter or hard spots are encountered in the work.

In the drawing herewith, Fig. 1 is a side elevation of my improved tool.

Fig. 2 is a similar view partly in central vertical section and indicating the manner in which the tool is anchored in position.

Fig. 3 is a transverse section on the plane 3—3 of Fig. 1.

Fig. 4 is a similar section on the plane 4—4 of Fig. 1 and looking in the direction of the arrows.

My boring tool is adapted to be anchored in a machine tool in the usual maner. There is a tapered shank 1 which is shown in Fig. 4 as adapted to engage within an opening 2 in the stock of the machine. It has a frictional fit therein so that it is held in stationary position. The tubular body 3 of the tool is formed with an axial chamber 4 within which the mandrel 5 is housed. The chamber 4 is formed with a reduced extension 6 on one end extending within the shank 1, this reduced extension being adapted to act as a guide for the stem 7 of the mandrel.

Said stem 7 is of cylindrical shape and adapted to slide within the recess 6. The body 5 of the mandrel is enlarged in diameter as compared with stem 7 and fits within the cylindrical chamber 4. It has a shoulder 8 at one end adapted to contact with a tubular nut 9 threaded within the end of the housing 3 and limiting the movement of the mandrel in that direction. The opposite end of the body 5 has a shoulder 10 which serves as a bearing for one end of a compression spring 11, which is fitted about the stem 7 of the mandrel and bears at its other end against the end of the chamber 4 and holds the mandrel resiliently forward, thus tending to hold the shoulder 8 in contact with the nut 9.

On one side of the mandrel is formed a longitudinal groove or channel 12, which tapers in depth in either direction but I have shown it as tapered from the outer end 13 inwardly along the face of the mandrel to a point closely adjacent the inner end of the body 5 of the mandrel. At that point a shoulder 14 on the mandrel forms the end of said groove. Where the groove is formed in the body 5 of the mandrel the groove is undercut at 15 to interfit with cutter block and to form a mortise or dovetailed groove indicated clearly in Fig. 3, in which the inner end of the cutter supporting block 16 may move. The wall of the housing adjacent the slot 15 is formed with a removable plate 16 to provide access to the interior of the housing at that point. As will be seen particularly in Fig. 1, the plate 17 fits within a longitudinal slot in the housing and is held normally in position by transverse pins 18 which extend through the walls of the housing and through said plate 16. To accommodate the use of the locking pins 18 the outer wall of the housing is grooved as shown at 19.

The cutter supporting block 16 is approximately rectangular in cross section as will be understood from Fig. 1 and projects through the wall of the housing so that its outer end is flush with the outer surface thereof. Said block has an anti-friction bearing as shown at 20, which allows the said block to be moved radially inward during the cutting operation under pressure.

It will be understood that upon assembly of the tool, the plate 17 is removed and the block 16, engaged with the slideway 15, may be moved through the open outer end of the slot in the tubular member and against the closed inner end of the slot. The plate 17 may then be secured in position.

Centrally of the supporting block 16 is a cutter 21. Said cutter fits within a rectangular opening longitudinally of the cutter block and projects therefrom the required distance to cut the largest diameter of the tapered opening which is to be formed in the work. As will be seen from Fig. 3, the outer end of the cutter 21 is relieved in one direction to form a cutting edge in the usual manner. This cutter is held wihin the block by means of a set screw 22 which allows its removal and replacement when desired.

Spaced rearwardly away from the cutter 21 is an outward extension 23 on the housing. This flange or extension serves as a mounting for a cutter 24 and a second cutter 25. The cutter 24 extends longitudinally through the flange 23 and has a forward cutting end shown at 26 in Fig. 1, which is adapted to engage the end of the work at the proper time and recess the end thereof. The cutting blade 25 exends radially outward away from the housing and has a forward cutting blade 27, which smooths off the end of the work at the proper time.

In the operation of the device the work which is indicated generally by the broken lines 28 may be, for example, a tool joint within which a tapered recess is to be formed. This work is held in the lathe in the usual manner and rotated about the tool by the usual means not here illustrated. During the operation of the device the shank 1 of the tool is moved gradually toward the work. As the work is rotated the cutter 21 will engage on the inner face thereof and cut a recess indicated at 29 in Fig. 2 within the work. As the end 13 of the mandrel is stationary, the movement of the housing longitudinally against the action of the spring 11 will move the cutter along the groove 15 and, due to the inclination of the said groove, the cutter will be gradually moved inwardly and the recess in the work shown at 29 will taper as shown by the dotted line in Fig. 2. When the tapered recess 25 has been cut to the proper depth the cutter 24 and the cutter 25 will engage the end of the work. The cutter 24 will cut an enlarged recess shown at 30 in Fig. 4 and the cutter 25 will then smooth off the end of the work and the job will be finished. The device holding the shank 1 will then be retracted so as to withdraw the tool from engagement with the work and by the usual manipulations of the machine parts the work may be removed.

It will be noted that my cutter is moved positively and uniformly by its engagement in the groove 15 of the mandrel to cut a uniformly tapering recess in the work. The tap is held in positive axial alignment so that no variations or lack of uniformity in the tapered recess cut by the tap may occur. The end of the work is recessed and smoothed off by the cutters 24 and 25 so that all that remains to be done in connection with the work is to thread the tapered area 29. The advantages of this construction will be obvious.

It is also to be noted that this device may be adapted to rotate where the work is stationary. This form of machine is not uncommon and need not be illustrated. Also, the inclination of the recess cut may be a flaring one instead of tapered simply by reversing the direction of inclination of the groove 12 in the mandrel. I do not therefore wish to be confined to the exact details of the embodiment of the invention herein disclosed further than is set forth in the claim which follows.

What is claimed as new is:

A tool of the class described comprising a pair of members of which one has a tubular portion telescopingly receiving a portion of the other, said tubular portion being provided with an axially extending slot having an open outer end and a closed inner end, the inner of said members having a longitudinally extending undercut slideway within the said tubular portion and inclined relative to the tool axis, a cutter block slidable in said slideway and interengaged with the latter so as to be radially displaced upon relative movement in either direction longitudinally of said slideway, said block upon assembly of the tool being movable through said slot to the closed inner end of the latter while engaged with said slideway, means securable to said tubular member to extend across said slot for the purpose of retaining said block at the inner end of said slot, means urging said members apart, and means limiting movement of said members apart.

RICHARD T. ROYE.